United States Patent Office 3,655,733
Patented Apr. 11, 1972

3,655,733
PREPARATION OF POLYFUNCTIONAL
ACRYLATES
F. Peter Guilmette, Mount Pleasant, and Norman L. Madison, Midland, Mich., assignors to The Dow Chemical Company, Midland, Mich.
No Drawing. Filed Apr. 19, 1968, Ser. No. 722,570
Int. Cl. C07c 69/54
U.S. Cl. 260—486 R                5 Claims

ABSTRACT OF THE DISCLOSURE

Methylene bisacrylate or methylene bismethacrylate is prepared by reacting methylene bromide, methylene iodide or a methylene bis (aromatic sulfonate) with an alkali metal acrylate or methacrylate. Reaction conditions are mild. The polyfunctional monomer is useful as a crosslinking agent in polymerization recipes.

---

Many polymerization recipes call for a polyfunctional vinyl monomer. Crosslinking introduced between polymer chains produces a variety of polymer properties ranging from high swellability in solvents to relatively rigid polymer compositions. Examples of such crosslinked polymers are taught in British Pat. No. 1,035,790, pubished July 13, 1966. Among crosslinking agents taught is methylene bismethacrylate. It is noted, however, that no method of preparing the methylene bisacrylates is given.

When known techniques of ester synthesis are reviewed, it becomes apparent that methylene bisacrylate or methylene bismethacrylate is not readily prepared. For instance, it is known to react polyformaldehyde (paraformaldehyde) or trioxymethylene with acid chlorides to produce methylene bisesters. This reaction is unsatisfactory in respect of acrylyl chloride, since the hydrogen chloride liberated as a byproduct results in the formation of several unidentifiable products.

Another possible mode of synthesis is the reaction of formaldehyde and similar materials with organic acid anhydrides. This reaction requires relatively high temperatures and consequently the sensitive acrylic moiety tends to undergo polymerization during the course of the reaction.

It is also known to prepare diesters of an acrylate by reaction with various glycols. This method is unsatisfactory for the preparation of methylene bisesters due to the fact that methylene glycol is not an isolatable compound.

It is an object of the invention to provide a new composition heretofore unavailable. Principal objects are to provide methylene bis acrylate and methylene bismethylacrylate as new polyfunctional vinyl monomers. A still further object is to provide a method for preparing the methylene bisesters.

The above objects are achieved in the instant invention by reacting an alkali metal acrylate or methacrylate with methylene bromide, methylene iodide or a methylene bis (aromatic sulfonate) in an inert reaction medium. A sufficient amount of the reaction medium is employed to at least partially dissolve the relatively organo insoluble alkali metal acrylate and to control the reaction temperature. Suitable for this purpose are the dipolar aprotic solvents, which are essentially inert to the reaction ingredients. Examples are dimethyl sulfoxide, dimethyl formamide, dimethyl acetamide, hexamethyl phosphoramide, tetramethylene sulfone, N-methyl pyrrolidone and acetonitrile. To minimize undesirable side reactions, oxygen is removed from the reaction system and a suitable inhibitor of vinyl polymerization such as phenothiazine, hydroquinone, or methoxy hydroquinone, is incorporated into the reaction mixture. Additional inhibitor is not required if the acrylic starting materials already contain one. As the reaction proceeds, the reactants may be allowed to remain at ambient conditions, preferably under an inert gaseous blanket. For best results the reactants are maintained at a temperature below about 50° C. to minimize the possibility of polymerization.

Some conversion to the desired product will occur within a few minutes but completion of the reaction may take as much as several hours or more depending upon the reaction conditions, e.g. continuous or batch reaction technique and reaction temperature. The methylene bisacrylate ester is separated from the reaction system by conventional separatory procedures. Conveniently, the byproduct inorganic halides or organic sulfonates and reaction medium are extracted by washing the reaction system with water. The diester is separated from water by simple decantation or extraction techniques. A purified polyfunctional monomer is recovered as an organic liquid by distillation under reduced pressure.

The invention will be better illustrated by reference to the following specific embodiment.

To a reaction vessel equipped with a stirrer and nitrogen purge were charged 27.5 grams of potassium acrylate, 200 cc. of dimethyl sulfoxide and 45 cc. of methylene bromide. Phenothiazine was added as a polymerization inhibitor and air was flushed from the reactor. The reactor was maintained at ambient temperature within the range from about 20 to about 35° C. for about 48 hours.

Singnificant yields are obtained with shorter reaction times but in this instance the reaction was allowed to continue for an extended period to obtain maximum conversion.

The reaction byproducts and reaction medium were extracted with water. Organic supernatant liquid was recovered by decantation, dried over magnesium sulfate and distilled under reduced pressure of about 0.3 millimeter of mercury. The highest boiling fraction, i.e. that with a boiling point of approximately 40° C., was collected and redistilled. The redistilled product was characterized by a boiling point of 38° C. under reduced pressure of 0.3 millimeter of mercury.

Elemental analysis indicated the compound contained 53.2% by weight percent carbon and 5.14% by weight hydrogen. This compared with a theoretical analysis for methylene bisacrylate of 53.8% carbon and 5.13% hydrogen. Further analysis by infrared spectroscopy confirmed the presence of the $C=CH_2$ double bond and the ester carbonyl. Nuclear magnetic resonance spectroscopy established the presence of the

group and gave the correct calculated ratios of all of the protons in the proposed material. It was therefore concluded that the product was methylene bisacrylate.

In a manner similar to the foregoing, a second preparation was run in an identical manner except that the reaction time was 30 minutes. The recovered organic product was again distilled at 38° C. under 0.3 millimeter of mercury. It was characterized by an infrared spectrum identical to that of the compound prepared above.

In a manner similar to the foregoing, methylene bismethacrylate is prepared by substituting for the potassium acrylate employed above either potassium or sodium methacrylate. Comparable bisesters are also obtained by substituting for the methylene bromide such reagents as methylene iodide or methylene bis (aromatic sulfonates)

of the benzenoid series, e.g. derivatives of benzene, alkyl benzenes and halo benzenes soluble in the reaction system, including for example methylene bis (p-toluene sulfonate), methylene bis (p-bromobenzene sulfonate) and the like amomatic disulfonate esters.

What is claimed is:

1. A method which comprises reacting a reagent of the class of methylene bromide, methylene iodide or a methylene bis (aromatic sulfonate) wherein the aromatic moiety is of the benzenoid series and an alkali metal acrylate or methacrylate in an inert organic reaction medium at a reaction temperature below about 50° C. for a period of time sufficient to produce the corresponding methylene bisacrylate or methylene bis-methacrylate.

2. A method as in claim 1 and including separating the reaction product from the reaction system.

3. A method as in claim 1 wherein a polymerization inhibitor is incorporated into the reaction system.

4. A method which comprises reacting methyelne bromide with sodium or potassium acrylate in an inert reaction medium in which the reactants are at least partially soluble and maintaining the reaction temperature below about 50° C. for a period of time sufficient to produce methylene bisacrylate.

5. A method according to claim 4 wherein the reaction medium is dimethylsulfoxide, dimethyl formamide, dimethyl acetamide, hexamethyl phosphoramide, tetramethylene sulfone, N-methyl pyrrolidone or acetonitrile.

References Cited

UNITED STATES PATENTS 2,296,837   9/1942   Coes, Jr. -------- 260—486 X

OTHER REFERENCES

March, J.: Advanced Organic Chem. React. Mech. and Structure, McGraw-Hill, 1968, p. 323.

JAMES A. PATTEN, Primary Examiner

P. J. KILLOS, Assistant Examiner